Dec. 23, 1941.   W. E. HAUSKNECHT   2,266,864
ARTICLE FEEDING APPARATUS
Filed March 13, 1940
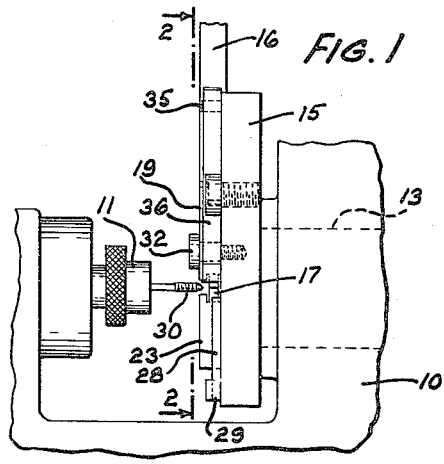
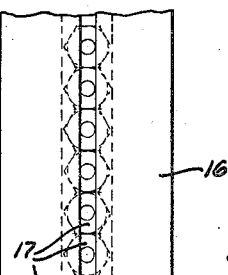
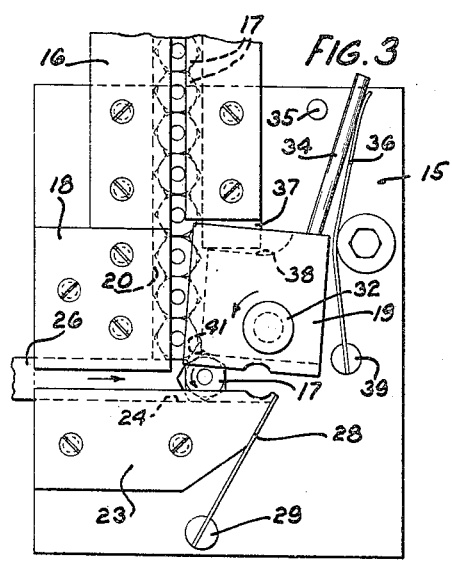
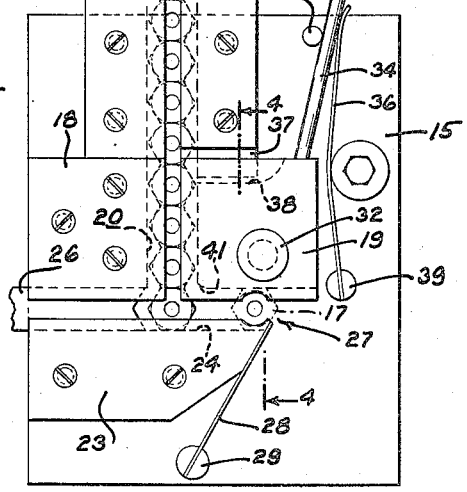
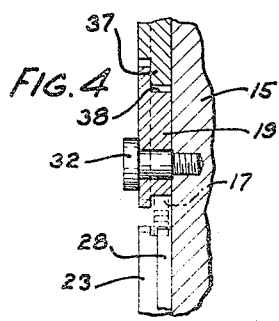
INVENTOR
W. E. HAUSKNECHT
BY Emery Robinson
ATTORNEY Patented Dec. 23, 1941

2,266,864

UNITED STATES PATENT OFFICE 2,266,864

ARTICLE FEEDING APPARATUS

William E. Hausknecht, Oak Park, Ill., assignor to Western Electric Company, Incorporated, New York, N. Y., a corporation of New York Application March 13, 1940, Serial No. 323,709

6 Claims. (Cl. 10—139)

This invention relates to article feeding apparatus, and more particularly to apparatus for feeding nut blanks to nut tapping machines.

An object of the invention is to provide a simple, inexpensive and reliable apparatus for feeding articles to an article working machine.

In accordance with the above object, one embodiment of the invention contemplates the provision of an apparatus for feeding hexagonal nut blanks to a nut tapping machine, in which the blanks are fed by gravity into a vertical guide passage, from the bottom of which a reciprocable plunger advances the blanks, one at a time, along a horizontal guide passage to the tapping position. A spring actuated pivoted member is provided at the entrance end of the horizontal guide passage whereby improperly positioned blanks are oriented into the proper angular position while being shifted to the tapping position.

A preferred embodiment of the invention is illustrated in the accompanying drawing, in which:

Fig. 1 is a side elevational view of a portion of a nut tapping machine equipped with a blank feeding apparatus embodying the invention;

Fig. 2 is a front elevational view of the blank feeding apparatus, looking in the direction of the arrows on line 2—2 of Fig. 1;

Fig. 3 is a view similar to Fig. 2, showing the manner in which an improperly positioned blank is oriented into proper angular position, and Fig. 4 is a fragmentary sectional view taken on line 4—4 of Fig. 2.

Referring to the drawing, there is illustrated in Fig. 1 a portion of a nut tapping machine comprising a stationary frame 10 in which a tap holding chuck 11 is mounted for rotation about a horizontal axis. Also mounted in the frame is a horizontally reciprocable piston 13 having a platen 15 attached to the forward end thereof. Secured at its lower end to the front surface of the platen is a vertical magazine 16 adapted to hold a vertical stack of nut blanks 17 (Fig. 2) which may be supplied to the magazine either manually or by any suitable mechanical means (none shown). A pair of guide plates 18 and 19 are arranged below the magazine and have their adjacent edges undercut and spaced apart to provide therebetween a vertical guide passage 20 in alignment with the magazine. The guide plate 18 is rigidly secured to the platen, while the guide plate 19 is pivotally mounted on the platen as and for the purpose hereinafter described.

A lower guide plate 23 is attached to the platen and its upper edge is undercut and spaced below the undercut bottom edge of upper guide plate 19 to provide a horizontal guide passage 24 joining the bottom end of the vertical guide passage 20. The nut blanks are fed by gravity from the magazine through the vertical guide passage, from the bottom of which a reciprocatory pusher bar 26 advances the blanks, one at a time, through the horizontal guide passage to the tapping position indicated in Fig. 2 by the reference numeral 27. A flat spring 28 is attached at one end to a pin 29 and its free end serves as a yieldable stop for insuring proper alignment of the nut blanks with a rotating tap 30 (Fig. 1) held in the chuck 11. Upon reciprocation of the platen 15 by any suitable means (none shown), the nut blank in the tapping position is fed onto the rotating tap and, after being threaded, is withdrawn therefrom upon reversal of the direction of rotation of the tap.

The vertical guide plate 19 is mounted for pivotal movement about a horizontal axis by being rotatably supported upon a pivot screw 32 secured to the platen 15. An upwardly projecting arm 34 is secured to or formed integral with the pivoted guide plate and cooperates with a stop pin 35 to limit the counterclockwise movement of the plate. A flat spring 36 is secured at one end to a pin 39 and its free end bears against the arm 34 of the pivoted guide plate for urging it in a counterclockwise direction. Thus, the guide plate is yieldably held in the position in which it is shown in Fig. 2. When the guide plate is in this position, properly positioned nut blanks, that is, blanks having opposed "flats" in horizontal planes, are freely shiftable from the bottom of the stack along the horizontal guide passage 24 to the tapping position indicated at 27 in Fig. 2. The lower right hand corner of the guide plate is slightly rounded, as indicated at 41, to facilitate the free entrance of properly positiond blanks into the horizontal guide passage.

The width of the horizontal guide passage is only slightly greater than the outside diameter of the blanks when measured across opposed "flats." Thus, only those blanks which are angularly positioned so that opposed "flats" thereof are parallel to the top and bottom surfaces of this guide passage are freely shiftable to the tapping position. Such blanks will be held against rotation during the tapping operation by being confined between the upper and lower guide plates 19 and 23, respectively. Occasionally, however, a blank at the bottom of the vertical stack may not be in the proper angular position to be shifted along the horizontal guide passage to the tapping position. Such improperly positioned blanks are automatically oriented into proper angular position by the pivoted guide plate 19. The manner in which this is accomplished is illustrated in Fig. 3, wherein an improperly positioned blank is shown entering the horizontal guide passage underneath the rounded inner corner of the pivoted guide plate. It will be noted that the blank has shifted the pivoted guide plate in a clockwise direction against the opposing force of the spring 36. Now as the pusher bar 26 continues to push the blank toward the tapping position, the blank is oriented into the proper position by being rotated counterclockwise by the pivoted guide plate under the force of the spring 36, which urges the guide plate in a counterclockwise direction. Thus, the blank is in the proper angular position upon reaching the tapping position, and is adapted to be held against rotation by the lower and upper guide plates, the latter having returned to its normal position under the force of the spring.

In order to prevent lateral displacement of the blanks in the vertical guide passage 20 when the pivoted guide plate is shifted to the position in which it is shown in Fig. 3, the magazine 16 is formed with a reduced extension 37 on its lower end which cooperates with the fixed guide plate 18 to hold the blanks in vertical alignment. The upper left hand corner of the pivoted guide plate is undercut, as indicated at 38, to accommodate this reduced extension of the magazine.

It is to be understood that the invention is not limited to the particular embodiment thereof herein illustrated and described, except insofar as is defined by the appended claims.

What is claimed is:

1. In an article feeding apparatus, a pair of guide plates cooperating to provide an article guiding passage, and means for advancing articles along said passage, one of said guide plates being mounted for pivotal movement about an axis of rotation disposed posteriorly of and remote from the entrance end of said guide passage.

2. In an article feeding apparatus, a pair of guide plates cooperating to provide an article guiding passage, means for advancing articles along said passage, one of said guide plates being pivotally mounted so that a portion thereof at the entrance end of the passage is movable toward and away from the other guide plate, and a spring for urging said movable portion toward said other guide plate.

3. In an apparatus for feeding nut blanks, a pair of members cooperating to provide therebetween a blank guiding passage for receiving and holding against rotation blanks disposed in a predetermined angular position, means for advancing blanks along said guide passage, one of said members being pivotally mounted on a pin disposed adjacent the exit end of said guide passage, means yieldably urging said pivoted member in one direction, and a stop opposing said means.

4. In an apparatus for feeding nut blanks, a pair of members cooperating to provide therebetween a blank guiding passage for receiving and holding against rotation blanks disposed in a predetermined angular position with respect to said guide passage, means for advancing blanks along said guide passage, one of said members being mounted for pivotal movement about an axis disposed adjacent the exit end of said guide passage.

5. In an apparatus for feeding nut blanks to the rotating tap of a nut tapping machine, a reciprocatory platen for feeding blanks onto the rotating tap, a pair of guide plates on said platen cooperating therewith to provide a guide passage for receiving and holding against rotation blanks disposed in a predetermined angular position with respect to said guide passage, a reciprocatory pusher bar for advancing blanks along said guide passage, one of said guide plates being pivotally mounted so that a portion thereof adjacent the entrance end of the passage is movable toward and away from the other guide plate, a spring yieldably urging said plate in one direction, and a stop opposing the spring for holding the plate in a position for permitting the free passage of predeterminedly positioned articles along said guide passage.

6. In an article feeding apparatus, a pair of guide members cooperating to provide therebetween an article guiding passage, means for advancing articles along said passage, one of said guide members being pivotally mounted so that a portion thereof at the entrance end of the passage is movable toward and away from the other guide member, yieldable means for urging said movable portion toward said other guide member, and a stop opposing said means.

WILLIAM E. HAUSKNECHT.